Nov. 16, 1954 C. THUMIM 2,694,759

COLD WELDED CONTACT

Filed Sept. 23, 1950

INVENTOR.
CARL THUMIM

BY Ostrolenk & Faber

ATTORNEYS 2,694,759
Patented Nov. 16, 1954

2,694,759

COLD WELDED CONTACT

Carl Thumim, Yeadon, Pa., assignor to I-T-E Circuit Breaker Company, Philadelphia, Pa., a corporation of Pennsylvania Application September 23, 1950, Serial No. 186,392
2 Claims. (Cl. 200—166)

Figure 1:
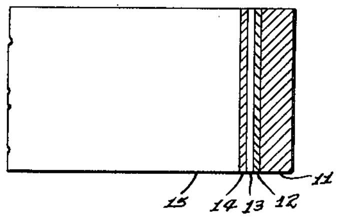

My invention relates to improved contacts on assemblies for circuit breakers and more particularly to a novel construction of arcing tip and contact arm assembly and method of assembly.

A circuit breaker comprises a contact arm assembly which consist of a movable arm usually made of copper to which has been secured a contact tip comprising such materials as silver tungsten, silver molybdenum, copper tungsten, etc.

The contact tip has heretofore been secured to the contact arm by brazing, welding or soldering methods. In all of these cases, however, the temperatures required for the process is so high that the copper on the contact arm, and particularly that portion adjacent to the contact tip where the temperature rise is greatest, is annealed and therefore softened.

During the opening and closing operations of the circuit breaker contact arm, however, the arm is subjected to severe shock. Accordingly, it must have sufficient strength to withstand such shock without the distortion of the contact arm. Indeed, even slight distortions of the contact arm will throw the position of the contact tip out of proper alignment with the fixed contact so that in contact closed position, the surfaces of the contact tip and the fixed contact are not in proper alignment for maximum effective engagement. The softening, therefore, of the copper near the contact tip as a result of methods heretofore used in securing the contact tip to the contact arm has presented a serious problem to which there has been no satisfactory solution, although considerable investigation has been carried on to the end that a solution to this problem be found.

It is well known that copper can be combined to copper by the mercury amalgam process. In accordance with the mercury amalgam process, the copper surfaces to be combined are coated or plated with mercury, by an electroplating bath or by mechanical rubbing each of the surfaces with mercury.

Interposed between the mercury coated copper surfaces is placed a thin sheet of fine silver of the thickness of approximately three mils. The mercury coated copper with the silver sheet interposed is assembled in a press and subjected to a pressure of from 500 to 40,000 pounds per square inch and heat is applied at a temperature of the order of 350° F. ±25 degrees.

As a result of this pressure and temperature, there is formed a copper amalgam and silver amalgam due to the action of the mercury on the copper and silver respectively. These two amalgams of copper and silver unite to form an alloy of copper and silver amalgams. The action of the pressure and temperature force the amalgams between the crystals of the copper and silver forming a strong mechanical bond firmly uniting the two copper members.

Because of the low temperature required for this mercury amalgam process, this process is highly desirable since it does not result in any damage to the characteristics of copper, such as do occur in the use of higher temperatures. However, it has heretofore been regarded as impossible to use this method in securing a contact tip to the contact arm because the mercury amalgam process is in practice and applicable only for combining copper to copper, silver to silver, or silver to copper and the contact tip as indicated above comprises other metals than silver or copper.

I have discovered that I can unite the contact tip to the copper arm by securing, in any well known method such as brazing, to the contact tip, a relatively thin strip of copper and then utilizing the mercury amalgam process for uniting the contact tip having a copper surface to the copper arm.

Accordingly, an object of my invention is to provide a novel contact arm assembly in which the contact tip is secured to the contact arm by the mercury amalgam process.

A further object of my invention is to provide a novel copper backed contact tip.

A still further object of my invention is to provide a novel silver backed contact tip.

A still further object of my invention is to provide a novel method of securing two members, one of which is not made of copper by means of the mercury amalgam process.

Figure 2:
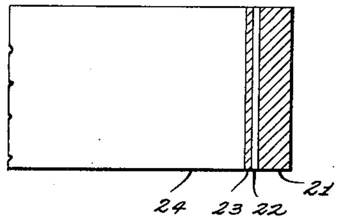

Other objects of my invention which together with the foregoing will appear in the detailed description in connection with the drawings, in which Figure 1 is a schematic illustration of one form of my invention;

Figure 2 is a schematic illustration of a modified form of my invention.

Referring now to Figure 1, I have shown there a contact tip 11. This contact tip may comprise any of the metals commonly used for contact tips such as silver, copper, tungsten, molybdenum, graphite, cadmium, carbon or any combinations of these or other metals commonly used and well known in the art.

To the contact tip comprising one or more of these metals (except fine silver), a thin sheet of copper 13 is secured in any well known manner as by means of a suitable solder 12 heated and melted at a temperature of the order of 1160° F. This will not, in any way, damage the characteristics of the contact tip since this contact tip in many instances is formed from powdered metals in which sintering temperatures substantially in excess of 1160° F. are employed.

Having now the contact tip which has as part thereof a copper surface (except when tip is of fine silver), I then proceed to bind this to the contact arm 15 of copper by the mercury amalgam method described above. In accordance therewith, I coat the surface of copper arm 15 with mercury and coat the copper surface 13 of the contact tip with mercury. Between these, I place a thin sheet of fine silver 14 having, as stated above, a thickness of approximately 3 mils, and the assembly is then placed in a press and pressed at a pressure of the order of 40,000 pounds per square inch and heated to a temperature of the order of 350° F. This temperature may be obtained by either heating the plates of the press by electricity, by induction heating around the assembly while it is in the press, or by steam. The pressure and temperature are applied for a sufficient period (½ to 3 hours) until the amalgam is forced into the spaces between the crystals of the copper and forms a strong mechanical bond. At the temperatures employed, the mercury is driven off, leaving clean bonded surfaces.

Where silver backed contacts are used, the same process is used except that the thin sheet of silver is omitted and only the copper coated with mercury.

In Figure 2, I have shown a modified form of my invention.

As stated above, contact tips are presently often formed of powdered metals which are placed in molds where they are subjected to pressures of the order of 50 tons per square inch and sintering temperatures of the order of from 1350° F. to higher temperatures depending upon the powdered metals employed. I propose to take advantage of this process in that I will place in the mold with the main powdered metals which are to make up the contact, a thin layer of pure powdered copper, making certain that the copper layer does not sink and comingle with the other metals in the mold. The composition is then sintered at pressures and temperatures in the manner described above, as is well known in the powder metallurgy art, resulting in a tip of arc resistant contact material 21 having a thin layer of copper 22 or silver, as shown in Figure 2. The contact tip with its copper or silver surfaces is now secured to the contact arm 24 by the mercury amalgam process described in detail above, utilizing the thin silver strip 23 (in the case of copper). By this procedure, I have eliminated the need of high temperature melting solder and produced a cleaner and simpler and stronger product.

It will now be clear from the detailed description given above, that by avoiding the high annealing temperatures heretofore found necessary in binding the contact tip to the contact arm, I have produced a contact arm assembled with contact tip in which the contact arm has not been annealed and softened and so can withstand much greater loads or blows without distortion.

Because, during the annealing process heretofore used distortions resulted even before use, it was frequently necessary to machine the parts to size after the tips had been secured to the contact arm. In accordance with the present construction, machining may be carried out of the component parts before they are fastened or secured without fear of distortion.

In actual service, when a fault current flows through the contact arm and contact tip, the fault current which may be from twelve times normal to greater values often heats the contact tip to incandescence even in the short period of $\frac{1}{10}$ of a second or less while contact engagement continues following initiation of a fault. This incandescence softens the binding material heretofore used, thus tending to separate the contact tip from the contact arm. This condition is particularly aggravated by the strong electro-magnetic force often acting on the contact tip and tending to separate it from the contact arm. In accordance with my novel construction this is avoided since the contact tip has now been more firmly united to the contact arm by the mercury amalgam method which is uneffected by high temperatures.

Although I have described my invention in connection with contact arms and tips, it will be apparent that it may be used wherever materials which are not made of copper are to be combined. Thus, it will be apparent that I may use the novel method I herein describe to combine any two metals to which can be secured copper surfaces as by plating or otherwise. I accordingly do not wish to be limited to the specific illustrations herein given except by the following claims.

I claim:

1. An electrical contact assembly comprising a refractory, electrically conductive and arc resistant contact tip and a copper contact arm; said contact tip having copper secured to one surface thereof; said contact arm having copper on at least one surface thereof; a sheet of silver interposed between said copper surfaces of said contact tip and said contact arm; said contact arm and said silver bonded and amalgamated by mercury.

2. An electrical contact assembly comprising a refractory, electrically conductive, and arc resistant contact tip containing a material from the group consisting of tungsten and molybdenum, and a copper contact arm; said contact tip having copper secured to one surface thereof; said contact arm having copper on at least one surface thereof; a sheet of silver interposed between said copper surfaces of said contact tip and said contact arm; said contact arm and said silver bonded and amalgamated by mercury.

References Cited in the file of this patent

UNITED STATES PATENTS

| Number | Name | Date |
|---|---|---|
| 1,986,224 | Sanders | Jan. 1, 1935 |
| 2,419,469 | Spiro | Apr. 22, 1947 |
| 2,486,341 | Stumbock | Oct. 25, 1949 |
| 2,504,906 | Tremblay | Apr. 18, 1950 |

FOREIGN PATENTS

| Number | Country | Date |
|---|---|---|
| 476,375 | Great Britain | Dec. 7, 1937 |